(12) United States Patent
Arnold et al.

(10) Patent No.: US 11,008,899 B2
(45) Date of Patent: May 18, 2021

(54) INTERNAL COMBUSTION ENGINE WITH EVAPORATIVE COOLING AND WASTE HEAT UTILIZATION

(71) Applicant: IAV GmbH Ingenieurgesellschaft Auto und Verkehr, Stollberg (DE)

(72) Inventors: Thomas Arnold, Stollberg/Mitteldorf (DE); Oliver Dingel, Chemnitz (DE)

(73) Assignee: IAV GMBH INGENIEURGESELLSCHAFT AUTO UND VERKEHR, Stollberg (DE)

(*) Notice: Subject to any disclaimer, the term of this patent is extended or adjusted under 35 U.S.C. 154(b) by 0 days.

(21) Appl. No.: 16/361,252

(22) Filed: Mar. 22, 2019

(65) Prior Publication Data
US 2019/0368383 A1    Dec. 5, 2019

(30) Foreign Application Priority Data
Mar. 28, 2018    (DE) .................. 10 2018 107 388.7

(51) Int. Cl.
*F01K 23/06* (2006.01)
*F01K 23/10* (2006.01)
(Continued)

(52) U.S. Cl.
CPC .......... *F01K 23/065* (2013.01); *F01K 23/101* (2013.01); *F01N 5/02* (2013.01);
(Continued)

(58) Field of Classification Search
CPC .................................................... F01K 23/065
See application file for complete search history.

(56) References Cited

U.S. PATENT DOCUMENTS 8,584,457 B2 * 11/2013 Kardos ............... F01P 3/20
60/599
9,140,209 B2    9/2015 Ernst et al.
(Continued)

FOREIGN PATENT DOCUMENTS

DE    102009056822 B3    12/2010
DE    102009028469 A1    2/2011
(Continued)

*Primary Examiner* — Laert Dounis
(74) *Attorney, Agent, or Firm* — Leydig, Voit & Mayer, Ltd.

(57) ABSTRACT

An internal combustion engine has evaporative cooling and waste heat utilization in a common vapor circulation system. The internal combustion engine includes a first exhaust gas heat exchanger. An evaporator system fluidly connected to the first exhaust gas heat exchanger is formed from a cooling jacket heat exchanger inside a housing for the evaporative cooling. A second exhaust gas heat exchanger is fluidly connected to the evaporator system. An expansion machine is fluidly connected to the second exhaust heat exchanger. A condenser is fluidly connected to the expansion machine. A feed pump is fluidly connected to the condenser. A third exhaust gas heat exchanger is disposed in an exhaust gas train. The first exhaust gas heat exchanger is fluidically connected to the second exhaust gas heat exchanger via the third exhaust gas heat exchanger and then via the cooling jacket heat exchanger.

18 Claims, 1 Drawing Sheet

(51) Int. Cl.
*F01N 5/02* (2006.01)
*F01P 3/20* (2006.01)
*F02M 26/23* (2016.01)
*F01P 3/22* (2006.01)

(52) U.S. Cl.
CPC .................. *F01P 3/20* (2013.01); *F01P 3/22* (2013.01); *F01P 3/2285* (2013.01); *F02M 26/23* (2016.02); *Y02T 10/12* (2013.01)

(56) References Cited

U.S. PATENT DOCUMENTS

| | | | |
|---|---|---|---|
| 2004/0250546 A1* | 12/2004 | Ichikawa | F01C 21/005 60/670 |
| 2010/0180584 A1* | 7/2010 | Berger | F02B 37/105 60/320 |
| 2012/0144825 A1 | 6/2012 | Stegmaier et al. | |
| 2012/0216763 A1 | 8/2012 | Barnes | |
| 2012/0279204 A1 | 11/2012 | Berger et al. | |
| 2013/0199178 A1* | 8/2013 | Kanou | F01K 7/22 60/605.2 |
| 2014/0137554 A1 | 5/2014 | Ernst et al. | |
| 2015/0176465 A1 | 6/2015 | Son et al. | |
| 2017/0089222 A1* | 3/2017 | Wright, Jr. | F01K 25/08 |

FOREIGN PATENT DOCUMENTS

| | | | | |
|---|---|---|---|---|
| GB | 428261 A | 4/1935 | | |
| WO | WO-2010000284 A2 * | 1/2010 | ........... | F01K 23/065 |
| WO | WO-2013172293 A1 * | 11/2013 | ........... | F01K 23/065 |
| WO | WO-2014175871 A1 * | 10/2014 | ................ | F01K 5/02 |

* cited by examiner

INTERNAL COMBUSTION ENGINE WITH EVAPORATIVE COOLING AND WASTE HEAT UTILIZATION

CROSS-REFERENCE TO PRIOR APPLICATION

Priority is claimed to German Patent Application No. DE 10 2018 107 388.7, filed on Mar. 28, 2018, the entire disclosure of which is hereby incorporated by reference herein.

FIELD

The present invention relates to an internal combustion engine with evaporative cooling and waste heat utilization according to the features of claim 1.

BACKGROUND

The efficiency of an internal combustion engine can be improved by utilizing the waste heat emanating from the internal combustion engine. For this purpose, systems are known for utilizing waste heat, which, for example, render waste heat from the coolant and the exhaust gas of the internal combustion engine usable by means of a vapor circulation system, and the energy provided thereby is, for example, used for driving or for charging the internal combustion engine or for charging a battery.

Patent GB 428,261 discloses a cooling system for internal combustion engines in which coolant evaporated in the cooling jacket is supplied for further heating to an exhaust gas heat exchanger and then to a steam turbine for charging the internal combustion engine. After condensation of the vapor, the liquid coolant is returned to the cooling jacket for cooling the internal combustion engine.

Published patent application US 2004/250546 A1 discloses an internal combustion engine with a waste heat recovery device, by means of which recovered waste heat is provided as mechanical energy. For this purpose, an evaporation circuit with several pumps, several heat exchangers, an expander, a condenser, and a reservoir is provided, by means of which waste heat is collected at different points of the internal combustion engine. This evaporation circuit is suitable for supplying water from the reservoir to a first heat exchanger in the exhaust pipe for heating it, and, further, to a water jacket formed in the cylinder block to further heat it. The heated water is then supplied by means of a high-pressure pump via a distribution valve to an evaporator, which is arranged as a second heat exchanger in the exhaust pipe between the first heat exchanger and the internal combustion engine. Then, the water vapor is supplied to the expander to provide mechanical energy and to the capacitor for liquefaction, before the water passes back into the tank.

Published patent application DE 10 2009 028 469 A1 discloses an internal combustion engine having an additional circuit designed as a steam circuit, which represents a device for utilizing the waste heat of the internal combustion engine. For this purpose, the additional circuit has an exhaust gas heat exchanger integrated in the exhaust gas system, a first heat exchanger in an exhaust gas recirculation system, a second heat exchanger in the exhaust gas recirculation system, an expander, a pump, and a condenser. The exhaust gas recirculated via the exhaust gas recirculation system flows through the first heat exchanger upstream of the second heat exchanger. The heat exchangers are connected to one another in the additional circuit in such a way that the working medium, by means of the pump downstream from the condenser, is supplied to the second heat exchanger in the exhaust gas recirculation system to heat the working medium, then to the exhaust gas heat exchanger for evaporation, and, further, to the first heat exchanger in the exhaust gas recirculation system for further heating, before it is expanded via the expansion turbine and returns to the condenser for liquefaction.

Patent DE 10 2009 056 822 B3 discloses an internal combustion engine with a waste heat recovery device which, by means of a separate heat exchanger, also renders useful waste heat from exhaust gas flowing through an exhaust gas recirculation system line. In particular, the heat exchanger in the exhaust gas recirculation system line has an auxiliary outlet via which a part of the working medium in the steam circuit is supplied to a further heat exchanger which is arranged in the exhaust gas system of the internal combustion engine.

U.S. Pat. No. 9,140,209 B2 discloses an internal combustion engine with a waste heat recovery device and evaporative cooling. The waste heat recovery device is designed as a vapor circulation system with a heat transfer unit having a cooling jacket heat exchanger in the engine block, an exhaust gas heat exchanger in the exhaust gas system, and a first heat exchanger and a second heat exchanger in an exhaust gas recirculation system. The exhaust gas recirculated via the exhaust gas recirculation system flows through the first heat exchanger upstream of the second heat exchanger. The heat exchangers are interconnected in the vapor circulation system in such a way that the working medium is supplied to the second heat exchanger in the exhaust gas recirculation system, then to the cooling jacket heat exchanger, then further to the exhaust gas heat exchanger, and finally to the first heat exchanger, before the collected waste heat is used. It is described that the evaporation of the working medium takes place in the cooling jacket heat exchanger and, optionally, also in the exhaust gas heat exchanger and in the first heat exchanger.

A system for recovering waste heat from an internal combustion engine is known from the published patent application US 2015/0 176 465 A1. The system comprises a working fluid circulation line having a turbine, a heat transfer unit connected to an exhaust gas recirculation system line of the internal combustion engine, and a gas/liquid separator. By means of the waste heat from the recirculated exhaust gas used by the heat exchanger unit, the working fluid is evaporated and relaxed by means of the turbine while providing mechanical output. The gas/liquid separator between the turbine and the heat transfer unit ensures that only gaseous working fluid is supplied to the turbine, in order to ensure optimum operation of the turbine.

SUMMARY

In an embodiment, the present invention provides an internal combustion engine with evaporative cooling and waste heat utilization in a common vapor circulation system. The internal combustion engine includes a first exhaust gas heat exchanger disposed in an exhaust gas recirculation system of the internal combustion engine. An evaporator system, which is fluidly connected to the first exhaust gas heat exchanger, is formed from a cooling jacket heat exchanger inside the internal combustion engine in a housing for the evaporative cooling. A second exhaust gas heat exchanger is disposed in the exhaust gas recirculation system, and is fluidly connected to the evaporator system. An expansion machine is fluidly connected to the second exhaust heat exchanger. A condenser is fluidly connected to the expansion machine. A feed pump is fluidly connected to the condenser and, in turn, to the first exhaust gas heat exchanger. A third exhaust gas heat exchanger is disposed in an exhaust gas train. The first exhaust gas heat exchanger is fluidically connected to the second exhaust gas heat exchanger via the third exhaust gas heat exchanger and then via the cooling jacket heat exchanger.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
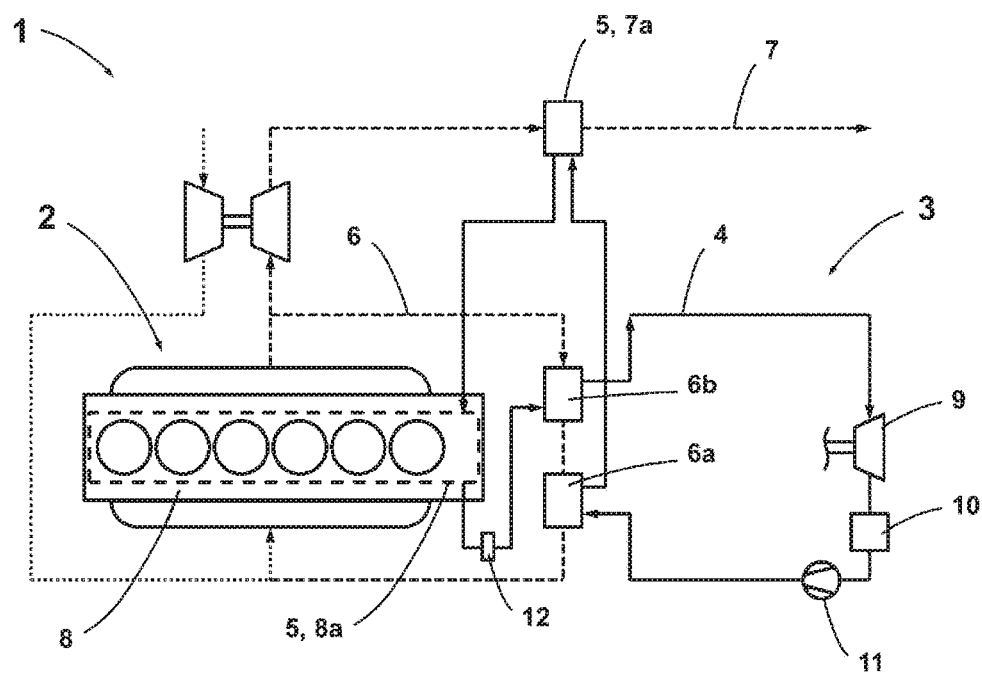
FIG. 1 shows a schematic representation of the internal combustion engine with evaporative cooling and waste heat.

Embodiments of the invention provide an internal combustion engine, with evaporative cooling and improved waste heat utilization, and a method for operating the internal combustion engine with evaporative cooling and improved waste heat utilization.

In an embodiment, the invention provides an advantageous internal combustion engine, with evaporative cooling and improved waste heat utilization. For this purpose, the internal combustion engine has a vapor circulation system by means of which use is made of the waste heat arising during operation of the internal combustion engine from evaporative cooling of a housing of the internal combustion engine and from exhaust gas cooling of a main exhaust gas stream in an exhaust gas tract of the internal combustion engine and from exhaust gas cooling of a partial gas stream in an exhaust gas recirculation system of the internal combustion engine. The evaporative cooling in the housing of the internal combustion engine relates to at least one cylinder head or an engine block of the internal combustion engine as component of the housing.

For waste heat utilization in a common conduit system, the vapor circulation system has a first exhaust heat exchanger in the exhaust gas recirculation system, a second exhaust heat exchanger in the exhaust gas recirculation system, and an evaporator system. The first exhaust gas heat exchanger is arranged downstream of the first exhaust gas heat exchanger in the exhaust gas recirculation system in the flow direction of the partial exhaust gas flow flowing through the exhaust gas recirculation system, so that the partial exhaust gas flow flows through the second exhaust gas heat exchanger upstream of the first exhaust gas heat exchanger when the exhaust gas recirculation system is operating. The evaporator system provided in the vapor circulation system is formed in this case in the housing from a third exhaust gas heat exchanger in the exhaust gas system and from a cooling jacket heat exchanger inside the internal combustion engine, which housing is specially designed as an internal combustion engine cooling jacket for evaporative cooling. In addition, an expansion machine, a condenser, and a feed pump are provided for the embodiment of the vapor circulation system in the conduit system.

The advantageous internal combustion engine according to an embodiment of the invention with evaporative cooling and waste heat utilization has, in a common vapor circulation system, the first exhaust gas heat exchanger in the exhaust gas recirculation system of the internal combustion engine, the evaporator system, which is fluidically connected to the first exhaust gas heat exchanger, the second exhaust heat exchanger in the exhaust gas recirculation system, which is fluidically connected to the evaporator system, the expansion machine, which is fluidically connected to the second exhaust gas heat exchanger, the condenser, which is fluidically connected to the expansion machine, and the feed pump, which is fluidically connected to the condenser and also to the first exhaust gas heat exchanger, wherein the evaporator system is formed from the cooling jacket heat exchanger and the third exhaust gas heat exchanger, and the first exhaust gas heat exchanger is fluidically connected via the third exhaust gas heat exchanger to the cooling jacket heat exchanger.

In the vapor circulation system, a working medium is circulated by the feed pump and the expansion machine and is present in sections as liquid working medium, as a mixture of liquid working medium and vaporous working medium—in particular, as wet vapor—or vaporous working medium—in particular, as hot vapor. For this purpose, the working medium is supplied by means of the feed pump in a liquid aggregate state to the first exhaust gas heat exchanger in the exhaust gas recirculation system. The liquid working medium is heated in the first exhaust gas heat exchanger while absorbing exhaust heat from the partial exhaust gas flow flowing through the exhaust gas recirculation system. In so doing, the liquid working medium may already partially evaporate. The further heating and at least partial evaporation of the working medium then takes place in the evaporator system, wherein the heating and evaporation occurs in the cooling jacket heat exchanger with the absorption of housing waste heat after further heat has been supplied to the working medium in the third exhaust gas heat exchanger using waste gas waste heat from the main exhaust gas flow flowing through the exhaust gas train. Heat is then further supplied to the vaporous working medium—in particular, present as wet steam—in the second exhaust gas heat exchanger using exhaust gas waste heat from the partial exhaust gas flow flowing through the exhaust gas recirculation system, whereby the working medium is heated before the gaseous working medium—in particular, present as hot vapor—is relaxed while releasing mechanical energy in the expansion machine, and is liquefied again in the condenser with the release of condensation heat and supplied to the first exhaust gas heat exchanger by means of the feed pump. The exhaust gas heat exchangers are preferably designed as countercurrent heat exchangers for optimum heat transfer.

In a particularly advantageous manner according to an embodiment of the invention, at least one valve unit is provided in the vapor circulation system, by means of which at least two different line paths result in the evaporator system via the third exhaust gas heat exchanger and cooling jacket heat exchanger, while providing different switching states between the first exhaust gas heat exchanger and the second exhaust gas heat exchanger. For this purpose, in the vapor circulation system, the feed pump is fluidically connected to the first exhaust gas heat exchanger, which is, in turn, fluidically connected to the valve unit. The valve unit, in a first switching state of the valve unit, fluidically connects the first exhaust gas heat exchanger via the third exhaust gas heat exchanger to the cooling jacket heat exchanger, and then fluidically connects the cooling jacket heat exchanger via the second exhaust gas heat exchanger to the expansion machine. The valve unit, in a second switching state of the valve unit, fluidically connects the first exhaust gas heat exchanger via the cooling jacket heat exchanger to the third exhaust gas heat exchanger, and then fluidically connects the third exhaust gas heat exchanger via the second exhaust gas heat exchanger to the expansion machine. The valve unit is, in particular, designed in such a way that the exhaust gas heat exchanger can be operated as a countercurrent heat exchanger. For this purpose, the valve unit can be combined from several separate valves.

If the first exhaust gas heat exchanger is fluidly connected to the cooling jacket heat exchanger via the third exhaust gas heat exchanger in a first line path in the evaporator system, then, after the liquid working medium is preheated using waste heat from the partial exhaust gas flow in the first exhaust gas heat exchanger recirculated via the exhaust gas recirculation system, there is further heating of the preheated liquid working medium using exhaust heat from a main exhaust gas flow flowing through the exhaust gas train in the third exhaust gas heat exchanger, and then evaporation to embody the evaporation cooling in the cooling jacket heat exchanger.

If the first exhaust gas heat exchanger is fluidically connected to the third exhaust gas heat exchanger via the cooling jacket heat exchanger in a second line path in the evaporator system, then, after the liquid working medium is preheated using waste heat from the partial exhaust gas flow in the first exhaust gas heat exchanger recirculated via the exhaust gas recirculation system, there is partial evaporation of the preheated liquid working medium to embody the evaporative cooling in the cooling jacket heat exchanger, and further heating using waste heat from a main exhaust gas flow in the third exhaust gas heat exchanger flowing through the exhaust gas train.

After passing through the two aforementioned line paths, the vaporous working medium—in particular, present as wet vapor—is then heated further in the second exhaust gas heat exchanger, with the absorption of exhaust gas waste heat from the partial exhaust gas flow flowing through the exhaust gas return system, before the gaseous working medium—in particular, present as hot vapor—is relaxed while releasing mechanical energy in the expansion machine, and is liquefied again in the condenser with the release of condensation heat and supplied to the first exhaust gas heat exchanger by means of the feed pump.

Due to the evaporative cooling by means of the cooling jacket heat exchanger, the working medium present in the two-phase region achieves a high heat transfer capacity with a constant cooling temperature, whereby the low mass flow demand for working medium has a positive effect on the efficiency of waste heat utilization. The mechanical energy recuperated from the waste heat of the internal combustion engine by the expansion machine by means of the vapor circulation system is used for driving the internal combustion engine and/or for driving auxiliary units of the internal combustion engine. Further, the recuperated mechanical energy is utilized by coupling the expansion machine to a generator for charging a battery. The vapor circulation system is advantageously operated as a Clausius-Rankine cycle.

Advantageously, according to an embodiment of the invention, at least one switchable bypass line is provided in the vapor circulation system, in order to switchably bypass single or multiple exhaust gas heat exchangers and/or the cooling jacket heat exchanger, and accordingly exclude them from the vapor circulation system, or to not bypass them, and accordingly include them in the vapor circulation system. The switchability of the bypass line is made possible by way of directional control valves so that the working medium flows either through the exhaust gas heat exchangers and the cooling jacket heat exchanger or through the respective bypass line. In a further development, the directional control valve is designed such that, in addition to the aforementioned flow paths, the working medium flows through exhaust gas heat exchanger and the cooling jacket heat exchanger and the bypass line.

Accordingly, a first bypass line is provided that branches off in the flow direction after the feed pump and returns again in the flow direction of the working medium after the first exhaust gas heat exchanger, or in the flow direction of the working medium after the cooling jacket heat exchanger, or in the flow direction of the working medium after the third exhaust gas heat exchanger.

Accordingly, a second bypass line is provided which branches off in the flow direction downstream of the first exhaust gas heat exchanger or downstream of the cooling jacket heat exchanger, and returns again upstream of the third exhaust gas heat exchanger in the flow direction of the working medium, or upstream of the second exhaust gas heat exchanger in the flow direction of the working medium, or upstream of the expansion machine in the flow direction of the working medium.

Accordingly, a third bypass line is provided which branches off in the flow direction downstream of the first exhaust gas heat exchanger or downstream of the third exhaust gas heat exchanger, and returns again upstream of the third exhaust gas heat exchanger in the flow direction of the working medium, or upstream of the second exhaust gas heat exchanger in the flow direction of the working medium, or upstream of the expansion machine in the flow direction of the working medium.

Advantageously, according to an embodiment of the invention, the vapor circulation system has a pressure control device by means of which the pressure in the vapor circulation system, and thus the boiling temperature of the working medium, is changed for the evaporative cooling, wherein the pressure control device is controlled on the basis of the operating conditions of the internal combustion engine—in particular, on the basis of information on knocking behavior, or on the basis of information on pollutant development.

By means of the pressure control device, for improved evaporative cooling and waste heat recovery, the pressure in the cooling jacket heat exchanger is changed—in particular, increased—in order to increase the boiling temperature of the working medium, or reduced, in order to reduce the boiling temperature of the working medium. In this case, the pressure control device is formed by an expansion machine having a variably adjustable expansion ratio, by a separate expansion valve having a variably adjustable expansion ratio, by a feed pump having a variably adjustable delivery volume, by forming at least one heat exchanger as a heat exchanger with a variably adjustable, transferable amount of heat, by a condenser with a variably adjustable cooling effect, by a variably pressurizable pressure tank, and/or by a recuperator with a variably adjustable, transferable amount of heat.

In a preferred embodiment, the pressure control device is designed as a separate expansion valve with a variably adjustable expansion ratio and is arranged downstream of the cooling jacket heat exchanger in the flow direction of the working medium in the vapor circulation system.

Figure 2:
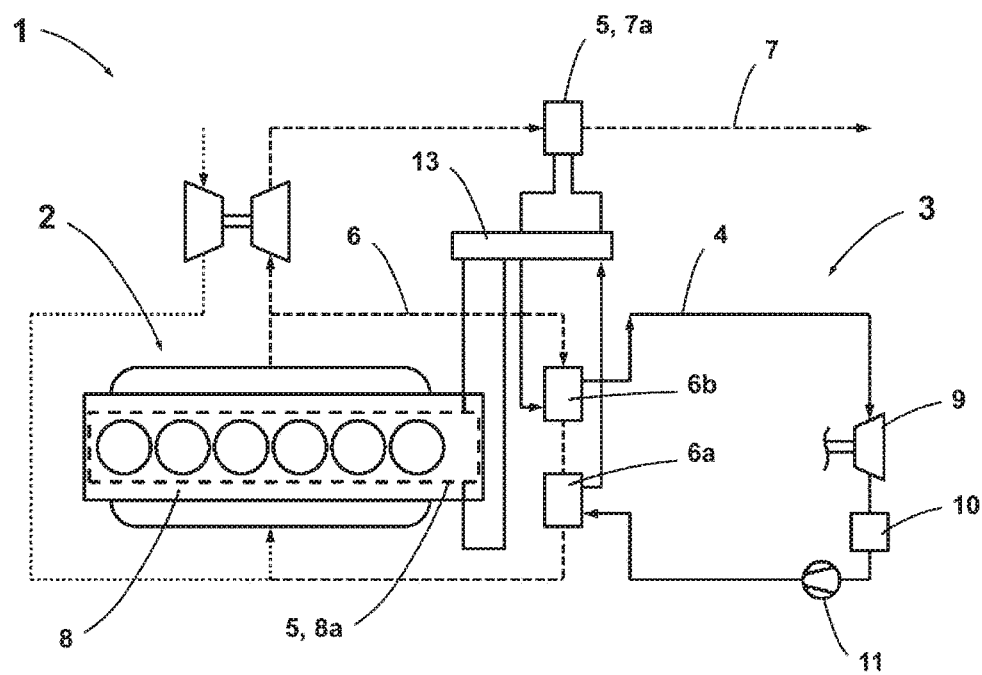
FIG. 2 shows a schematic representation of the internal combustion engine with evaporative cooling and waste heat in an alternative embodiment.

With reference to FIGS. 1 and 2, embodiments of an internal combustion engine 1 according to the invention with evaporative cooling 2 and waste heat utilization 3 are shown here by way of example.

FIG. 1 shows a schematic representation of the internal combustion engine 1 with evaporative cooling 2 and waste heat 3.

An advantageous embodiment according to the invention of the internal combustion engine 1 with evaporative cooling 2 and waste heat 3, shown in FIG. 1, has a vapor circulation system 4 with an evaporator system 5, by means of which the waste heat that occurs during the operation of the internal combustion engine 1 is used.

The vapor circulation system 4 additionally has a first exhaust gas heat exchanger 6a in an exhaust gas recirculation system 6, a second exhaust gas heat exchanger 6b in the exhaust gas recirculation system 6, and a third exhaust gas heat exchanger 7a in an exhaust gas system 7, and a cooling jacket heat exchanger 8a inside the internal combustion engine 1 in the housing 8 for the evaporative cooling 2, wherein the evaporator system 5 is formed from the cooling jacket heat exchanger 8a and the third exhaust gas heat exchanger 7a. In this case, the first exhaust heat exchanger 6a is fluidly connected to the cooling jacket heat exchanger 8a via the third exhaust heat exchanger 7a. Furthermore, an expansion machine 9, a condenser 10, and a feed pump provided 11 are provided in the vapor circulation system 4. During the operation of the exhaust gas recirculation system 6, a partial exhaust gas flow that flows through the exhaust gas recirculation system 6 flows through the second exhaust gas heat exchanger 6b before the first exhaust gas heat exchanger 6a.

Advantageously, according to the invention, in the vapor circulation system 4, the feed pump 11 fluidically connected to the condenser 10 is fluidically connected via the first exhaust gas heat exchanger 6a to the evaporator system 5, i.e., to the third exhaust gas heat exchanger 7a and then to the cooling jacket heat exchanger 8a, and further via the second exhaust gas heat exchanger 6b to the expansion machine 9, which, in turn, is fluidically connected to the condenser 10 to embody the vapor circulation system 4. Furthermore, an expansion valve 12 with a variably adjustable expansion ratio is arranged in the flow direction of the working means in the vapor circulation system 4 downstream from the cooling jacket heat exchanger 8a.

By way of example, with reference to FIG. 2, an alternative embodiment of an internal combustion engine 1 according to the invention is shown here with evaporative cooling 2 and waste heat 3.

FIG. 2 shows a schematic representation of the internal combustion engine 1 with evaporative cooling 2 and waste heat 3 in an alternative embodiment.

An advantageous alternative embodiment according to the invention of the internal combustion engine 1 with evaporative cooling 2 and waste heat 3, shown in FIG. 2, has, in the vapor circulation system 4, a valve unit 13 that is fluidically connected to the evaporator system 5, to the first exhaust gas heat exchanger 6a, and to the second exhaust gas heat exchanger 6b. While providing various switching states by means of the valve unit 13, at least two different line paths are provided, between the first exhaust gas heat exchanger 6a and second exhaust gas heat exchanger 6b, in the evaporator system 5 by the third exhaust gas heat exchanger 7a and the cooling jacket exchanger 8a. In the vapor circulation system 4, the feed pump 11 is fluidically connected to the first exhaust gas heat exchanger 6a, and this, in turn, is fluidically connected to the valve unit 13. The valve unit 13, in a first switching state, fluidically connects the first exhaust gas heat exchanger 6a via the third exhaust gas heat exchanger 7a to the cooling jacket heat exchanger 8a, and then this, via the second exhaust gas heat exchanger 6b, to the expansion machine 9. The valve unit 13, in a second switching state, fluidically connects the first exhaust gas heat exchanger 6a via the cooling jacket heat exchanger 8a to the third exhaust gas heat exchanger 7a, and then this, via the second exhaust gas heat exchanger 6b, to the expansion machine 9. The expansion machine 9 is then fluidically connected, in turn, to the condenser 10 to embody the vapor circulation system 4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS USED

1 Internal combustion engine
2 Evaporative cooling
3 Waste heat utilization
4 Vapor circulation system
5 Evaporator system
6 Exhaust gas recirculation system
6a, 6b First, second exhaust gas heat exchanger
7 Exhaust gas train
7a Third exhaust gas heat exchanger
8 Housing
8a Cooling jacket heat exchanger
9 Expansion machine
10 Condenser
11 Feed pump
12 Expansion valve
13 Valve unit

What is claimed is:

1. An internal combustion engine with evaporative cooling and waste heat utilization in a common vapor circulation system, the internal combustion engine comprising:

a first exhaust gas heat exchanger disposed in an exhaust gas recirculation system of the internal combustion engine;

an evaporator system, the evaporator system being fluidly connected, via the common vapor circulation system, to the first exhaust gas heat exchanger, the evaporator system including a cooling jacket heat exchanger inside the internal combustion engine in a housing for the evaporative cooling;

a second exhaust gas heat exchanger disposed in the exhaust gas recirculation system, the second exhaust gas heat exchanger being fluidly connected, via the common vapor circulation system, to the evaporator system;

a valve unit that is fluidically connected, via the common vapor circulation system, to the first exhaust gas heat exchanger and the second exhaust gas heat exchanger, the valve unit being configured to provide at least two different line paths in the evaporator system while also providing various switching states between the first exhaust gas heat exchanger and second exhaust gas heat exchanger;

an expansion machine, the expansion machine being fluidly connected, via the common vapor circulation system, to the second exhaust heat exchanger;

a condenser, the condenser being fluidly connected, via the common vapor circulation system, to the expansion machine;

a feed pump, the feed pump being fluidly connected, via the common vapor circulation system, to the condenser and the first exhaust gas heat exchanger; and a third exhaust gas heat exchanger disposed in an exhaust gas train, wherein the common vapor circulation system fluidically connects, in a direction of flow of a working medium of the common vapor circulation system, the first exhaust gas heat exchanger to the second exhaust gas heat exchanger via the third exhaust gas heat exchanger and then via the cooling jacket heat exchanger, wherein, in a first switching state, the first exhaust gas heat exchanger is fluidically connected, via the third exhaust gas heat exchanger and then via the cooling jacket heat exchanger, to the second exhaust gas heat exchanger, and wherein, in a second switching state, the first exhaust gas heat exchanger is fluidically connected, via the cooling jacket heat exchanger and then via the third exhaust gas heat exchanger, to the second exhaust gas heat exchanger.

2. The internal combustion engine with evaporative cooling and waste heat utilization according to claim 1, further comprising a pressure control device arranged, as a separate expansion valve with a variably adjustable expansion ratio, downstream from the cooling jacket heat exchanger in the direction of flow of the working medium.

3. The internal combustion engine with evaporative cooling and waste heat utilization according to claim 1, wherein the common vapor circulation system is configured to provide, to the first heat exchanger, the working medium in a liquid form, wherein the first heat exchanger is configured to supply, to the working medium in the liquid form, heat from a partial exhaust flow in the exhaust gas recirculation system to provide a preheated liquid working medium.

4. The internal combustion engine with evaporative cooling and waste heat utilization according to claim 3, wherein the third exhaust gas heat exchanger is configured to supply, to the preheated liquid working medium, heat from a main exhaust flow in the exhaust gas train to provide a further heated working medium, and wherein the cooling jacket heat exchanger is configured to supply, to the further heated working medium, heat from the housing to evaporate the working medium and thereby provide a wet vapor working medium.

5. The internal combustion engine with evaporative cooling and waste heat utilization according to claim 3, wherein the second heat exchanger is configured to supply, to the wet vapor working medium, additional heat from the partial exhaust flow in the exhaust gas recirculation system to convert the wet vapor working medium to a hot vapor working medium.

6. The internal combustion engine with evaporative cooling and waste heat utilization according to claim 5, wherein the expansion machine is configured to extract mechanical energy from the hot vapor working medium, and wherein the condenser is configured to re-liquefy the working medium.

7. The internal combustion engine with evaporative cooling and waste heat utilization according to claim 6, the expansion machine is coupled to a generator for charging a battery and/or the expansion machine is configured to provide energy for driving an auxiliary unit of the internal combustion engine.

8. An internal combustion engine with evaporative cooling and waste heat utilization in a common vapor circulation system, the internal combustion engine comprising:

a first exhaust gas heat exchanger disposed in an exhaust gas recirculation system of the internal combustion engine;

an evaporator system, which is fluidly connected to the first exhaust gas heat exchanger, the evaporator system being formed from a cooling jacket heat exchanger inside the internal combustion engine in a housing for the evaporative cooling;

a second exhaust gas heat exchanger disposed in the exhaust gas recirculation system, which is fluidly connected to the evaporator system;

an expansion machine, which is fluidly connected to the second exhaust heat exchanger;

a condenser, which is fluidly connected to the expansion machine;

a feed pump, which is fluidly connected to the condenser and, in turn, to the first exhaust gas heat exchanger;

a third exhaust gas heat exchanger disposed in an exhaust gas train, the first exhaust gas heat exchanger being fluidically connected to the second exhaust gas heat exchanger via the third exhaust gas heat exchanger and then via the cooling jacket heat exchanger; and a valve unit that is fluidically connected to the first exhaust gas heat exchanger and the second exhaust gas heat exchanger, the valve unit being configured to provide at least two different line paths in the evaporator system while also providing various switching states between the first exhaust gas heat exchanger and second exhaust gas heat exchanger, wherein, in a first switching state of the valve unit, the first exhaust gas heat exchanger is fluidically connected, via the third exhaust gas heat exchanger and then via the cooling jacket heat exchanger, to the second exhaust gas heat exchanger, and wherein, in a second switching state of the valve unit, the first exhaust gas heat exchanger is fluidically connected, via the cooling jacket heat exchanger and then via the third exhaust gas heat exchanger, to the second exhaust gas heat exchanger.

9. The internal combustion engine with evaporative cooling and waste heat utilization according to claim 8, wherein the common vapor circulation system is configured to be operated as a Clausius-Rankine cycle.

10. The internal combustion engine with evaporative cooling and waste heat utilization according to claim 8, wherein the expansion machine is coupled to a generator for charging a battery.

11. The internal combustion engine with evaporative cooling and waste heat utilization according to claim 8, wherein the expansion machine is configured to recuperate mechanical energy from the waste heat of the internal combustion engine for driving an auxiliary unit of the internal combustion engine.

12. The internal combustion engine with evaporative cooling and waste heat utilization according to claim 8, wherein the common vapor circulation system is configured to provide, to the first heat exchanger, a working medium of the common vapor circulation system in a liquid form, wherein the first heat exchanger is configured to supply, to the working medium in the liquid form, heat from a partial exhaust flow in the exhaust gas recirculation system to provide a preheated liquid working medium.

13. The internal combustion engine with evaporative cooling and waste heat utilization according to claim 12, wherein, in the first switching state of the valve unit:
the third exhaust gas heat exchanger is configured to supply, to the preheated liquid working medium, heat from a main exhaust flow in the exhaust gas train to provide a further heated working medium, and
the cooling jacket heat exchanger is configured to supply, to the further heated working medium, heat from the housing to provide a wet vapor working medium, and
wherein, in the second switching state of the valve unit:
the cooling jacket heat exchanger is configured to supply, to the preheated liquid working medium, heat from the housing to provide a further heated working medium, and
the third exhaust gas heat exchanger is configured to supply, to the further heated working medium, heat from a main exhaust flow in the exhaust gas train to provide a wet vapor working medium.

14. The internal combustion engine with evaporative cooling and waste heat utilization according to claim 12, wherein the second heat exchanger is configured to supply, to the working medium, additional heat from the partial exhaust flow in the exhaust gas recirculation system to convert the working medium from a wet vapor working medium to a hot vapor working medium.

15. The internal combustion engine with evaporative cooling and waste heat utilization according to claim 14, wherein the expansion machine is configured to extract mechanical energy from the hot vapor working medium, and wherein the condenser is configured to re-liquefy the working medium.

16. An internal combustion engine, comprising:
a common vapor circulation system configured to perform evaporative cooling and waste heat utilization, the common vapor circulation system comprising:
a first exhaust gas heat exchanger disposed in an exhaust gas recirculation system,
a third exhaust gas heat exchanger disposed in an exhaust gas train,
a cooling jacket heat exchanger,
a second exhaust gas heat exchanger disposed in the exhaust gas recirculation system,
one or more valves configured to provide, in a directional flow path for the working medium between the first exhaust gas heat exchanger and the second exhaust gas heat exchanger, at least a first line path and a second line path,
an expansion machine,
a condenser, and
a feed pump,
wherein the cooling jacket heat exchanger is formed from a housing of the internal combustion engine;
wherein the common vapor circulation system provides a directional flow path for a working medium that extends from the first exhaust gas heat exchanger to the second exhaust gas heat exchanger via the third exhaust gas heat exchanger and the cooling jacket heat exchanger;
wherein the first line path connects the first exhaust gas heat exchanger, first via the third exhaust gas heat exchanger and then via the cooling jacket heat exchanger, to the second exhaust gas heat exchanger; and
wherein the second line path connects the first exhaust gas heat exchanger, first via the cooling jacket heat exchanger and then via the third exhaust gas heat exchanger, to the second exhaust gas heat exchanger.

17. The internal combustion engine according to claim 16, wherein the common vapor circulation system is configured to provide, to the first heat exchanger, the working medium in a liquid form,
wherein the first heat exchanger is configured to supply, to the working medium in the liquid form, heat from a partial exhaust flow in the exhaust gas recirculation system to provide a preheated liquid working medium,
wherein the third exhaust gas heat exchanger is configured to supply, to the preheated liquid working medium, heat from a main exhaust flow in the exhaust gas train to provide a further heated working medium,
wherein the cooling jacket heat exchanger is configured to supply, to the further heated working medium, heat from the housing to provide a wet vapor working medium, and
wherein the second heat exchanger is configured to supply, to the wet vapor working medium, additional heat from the partial exhaust flow in the exhaust gas recirculation system to convert the wet vapor working medium to a hot vapor working medium.

18. The internal combustion engine according to claim 17, wherein the expansion machine is configured to extract mechanical energy from the hot vapor working medium, and wherein the condenser is configured to re-liquefy the working medium.

* * * * *